United States Patent
Pajari, Sr.

[11] Patent Number: 5,116,147
[45] Date of Patent: May 26, 1992

[54] ANTI-BLOCKAGE BEARING

[76] Inventor: George Pajari, Sr., 503 Atlas Ave., Toronto, Ontario, Canada, M6C 3R4

[21] Appl. No.: 702,494

[22] Filed: May 20, 1991

Related U.S. Application Data

[63] Continuation-in-part of Ser. No. 394,055, Aug. 15, 1989, abandoned.

[30] Foreign Application Priority Data

Oct. 19, 1988 [CA] Canada ................................. 580568

[51] Int. Cl.⁵ .................. F16C 33/58; F16H 25/16
[52] U.S. Cl. .................................... 384/615; 74/56; 173/48; 384/609
[58] Field of Search .......... 384/590, 97, 604, 608-619, 384/621, 622, 623; 74/56; 173/48, 58, 114, 144; 175/228

[56] References Cited

U.S. PATENT DOCUMENTS

| | | | |
|---|---|---|---|
| 778,379 | 12/1904 | Slentz | 384/609 |
| 2,146,454 | 2/1939 | Sutliff | 175/298 |
| 2,153,883 | 5/1939 | Foster | 175/298 |
| 3,348,480 | 10/1967 | Bohac et al. | 74/56 X |
| 3,403,668 | 10/1968 | Schottler | 74/56 X |
| 3,443,446 | 5/1969 | Buergel | 74/56 |
| 3,765,254 | 10/1973 | Schluter et al. | 384/615 X |

Primary Examiner—Daniel P. Stodola
Assistant Examiner—William G. Battista, Jr.
Attorney, Agent, or Firm—Jones, Tullar & Cooper

[57] ABSTRACT

An anti-blockage bearing for use in rotary core drilling of rock or other hard earth. Situated between the upper end of a freely suspended core barrel assembly and the core barrel coupling, the invention consists of spherical bearings retained within an upper and a lower annular housing, one or both of which are provided with a thrust race comprising a plurality of indentations and intervening ridges. During normal drilling, the core barrel is freely suspended within the outer tube of the lower end of the drill string. In the event of blockage, the core barrel will automatically be pushed upwards causing the thrust race of the lower housing member to bias the bearings against the thrust race of the upper housing member. As the bearings encounter the ridges and indentations of the thrust races, a jarring vibration action is imparted to the core barrel, dislodging the blockage. The vibrational frequency of the anti-blockage bearing can be modified by varying the number of spherical bearings or the number of ridges in the thrust races.

3 Claims, 1 Drawing Sheet

ANTI-BLOCKAGE BEARING

This application is a continuation-in-part of U.S. Ser. No. 07/394,055, filed Aug. 15, 1989, now abandoned.

BACKGROUND OF THE INVENTION

The present invention relates to core drilling of rock or earth and in particular to an anti-blockage bearing for dislodging blockages of the core barrel.

Mechanical jars are known in apparatus for drilling in earth or rock. The purpose of the jar is to impart a force, generally a blow or series of blows, to dislodge a drill rod train which has become lodged in the drill hole.

Core drilling is widely used. In such drilling assemblies, the lower end of the drill string houses a cylindrical hollow member, called the core barrel, which serves to receive samples of the rock or earth for testing. Blockage of the core barrel would defeat the object of this form of sample drilling as no progress can occur and damage can result to the drill bit. Further, core retrieval with only partial core samples would substantially increase drilling cost.

Known jars have limitations. In general, drilling jars have a preset tensional threshold which, when exceeded, results in the delivery of a blow designed to dislodge the blockage. However, damage to the drill string can result if the tension control is improperly set. Such designs are generally not well suited to deliver blows in rapid succession and often deteriorate fairly rapidly due to the large frictional forces involved in their operation.

SUMMARY OF INVENTION

The present invention provides a durable anti-blockage bearing capable of delivering a vibrational force for the dislodgement of a blockage of the core barrel. It has been found that the effectiveness of the vibration producing-bearing improves with the increase in the frequency of the vibrations. With drill strings operating at 1000 rpm, the present invention can easily deliver 12,000 vibrations per minute. The vibrational mode of the anti-blockage bearing is automatically engaged when a blockage of the core barrel occurs. The vibrational force will be applied no longer than is necessary to dislodge the blockage. These features, along with the design of the elements, substantially reduce frictional wear thereby increasing the operating life time of the invention.

Accordingly, the invention provides an apparatus for rotary core drilling comprising:
an outer tube having a longitudinal axis,
a core barrel assembly freely suspended within the outer tube for axial motion with respect to the outer tube, the core barrel assembly having a lower end for receiving a core sample and an upper end,
a core barrel coupling assembly supporting the outer tube for mutual rotation; and
an anti-blockage bearing situated between the upper end of the core barrel assembly and the core barrel coupling, the anti-blockage bearing comprising a plurality of spherical bearings retained within coaxial upper and lower housing members mounted to the core barrel coupling for rotation therewith and on the upper end of the core barrel assembly, respectively, in which at least one of the housing members is provided with an annular thrust race having an undulating surface incorporating a plurality of ridges and intervening indentations, the spherical bearings being normally disengaged from the annular thrust race of the upper housing member, wherein a blockage at the lower end of the core barrel assembly when receiving a core sample axially elevates the core barrel assembly and the lower housing member in the direction of the longitudinal axis to thereby automatically displace the core barrel assembly, the lower housing member and the spherical bearings and bias the spherical bearings against the annular thrust race of the upper housing resulting in a relative rotation of the core barrel coupling and the upper housing member with the core barrel coupling and the lower housing member, whereby the resulting relative rotation produces vibrational force on the core barrel assembly in a downward direction relative to the longitudinal axis.

BRIEF DESCRIPTION OF THE DRAWINGS

The invention will now be described with reference to the following diagrams, in which.

DESCRIPTION OF PREFERRED EMBODIMENT

Figure 1:
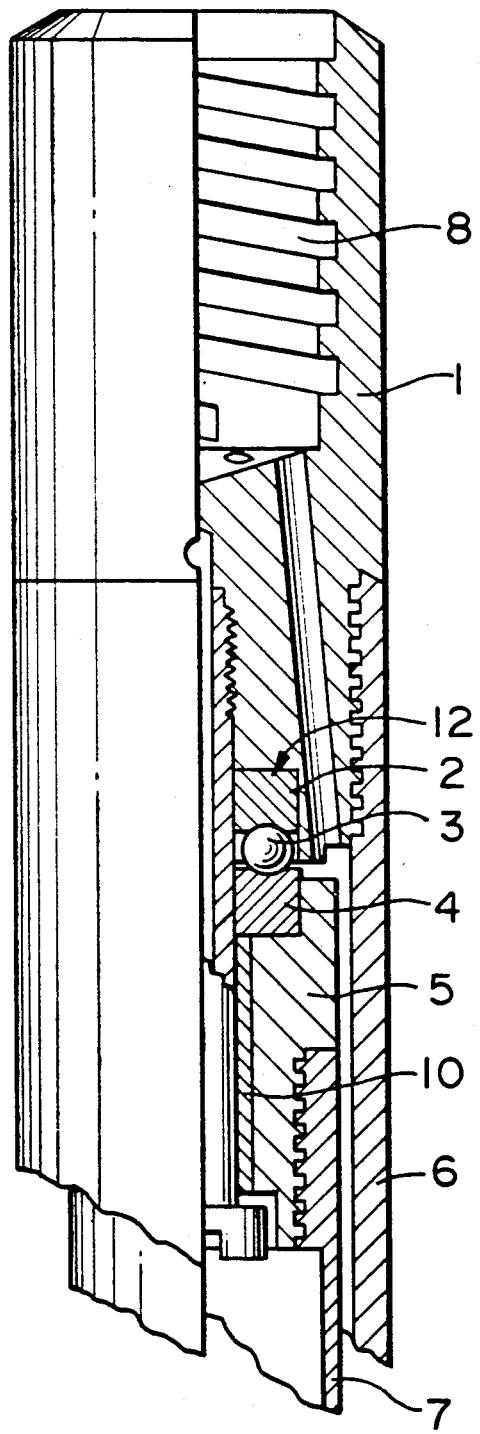
FIG. 1 shows a cut away cross sectional view of the invention mounted in a drill string (between the top of the core barrel and the core barrel coupling).
Figure 2:
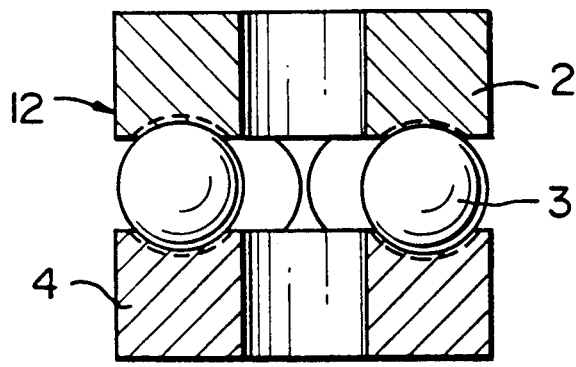
FIG. 2 shows a cross sectional view of the invention.
Figure 3:
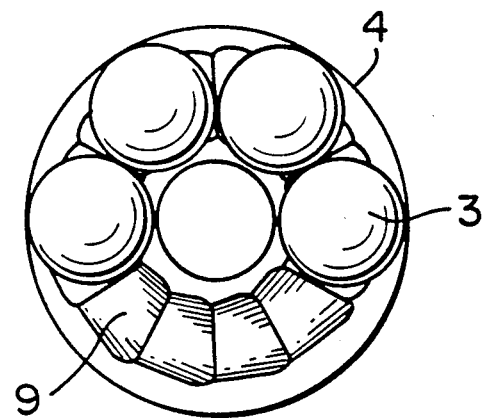
FIG. 3 shows a plan view of the lower thrust race from above.

The anti-blockage bearing 12 of the invention is shown in position in a typical core drilling system in FIG. 1. This figure depicts a specific assembly currently used in "W" series diamond drill core drilling, but with modification of the bearing retaining means 5, the invention can be used in any core retrieval assembly. In the preferred embodiment, the anti-blockage bearing 12, including elements 2, 3, 4 is situated between the upper end of the core barrel assembly 7 and the core barrel coupling 1. The core barrel coupling 1 engages the drill rod 8 to form a single rigid identity between the bit/reamer outer tube and the drill rod. The core barrel assembly 7 is freely suspended in the hollow outer tube 6 by a radial friction bearing 10 and a lower friction thrust bearing and is therefore independent of the longitudinal and rotational force applied to the drill rods.

Figure 4:
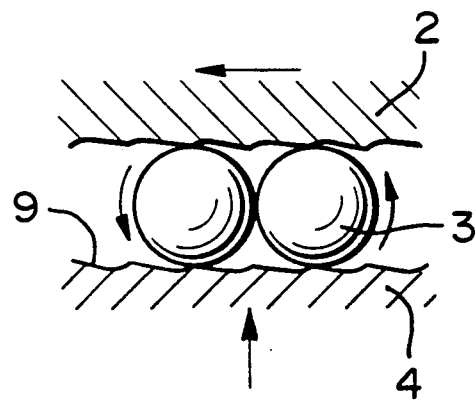
FIG. 4 shows a partial concentric section of FIG. 3 through the mid-section of the spherical bearings illustrating the ridges with gently rising slopes and steeply falling slopes. The upward directed arrow indicates the direction of force on the bearing when core barrel blockage has occurred.

The bearing 12 is comprised of a plurality of spherical bearings 3 constructed from a durable metallic material. These bearings are situated between an upper and a lower annular retaining member 2, 4, respectively. In the preferred embodiment, the lower retaining member 4 is housed in the upper portion of the core barrel assembly and the upper retaining member 2 is housed in the core barrel coupling 1. In the preferred embodiment, both retaining members are provided with a thrust race comprised of a plurality of indentations and intervening ridges. These indentations and ridges form annular staircases 9 upon which the spherical bearings will rise and fall when the invention is in use as set out below. The annular staircase is comprised of steps having gently rising slopes and steeply falling slopes as shown in FIG. 4. In one embodiment, the thrust races may be cast directly into the upper end of the core barrel and the lower end of the core barrel coupling.

While drilling is proceeding without any blockage, the core barrel assembly is freely suspended in the hollow of the outer tube 6. In this position the spherical bearings 3 rest on the lower retaining member 4 and are not in contact with the thrust race of the upper retaining member 2. In the event of a blockage, the core barrel assembly is pushed upwards thereby bringing the bearings into engagement with the rotating upper thrust race. This will impart a vibrational force to the core barrel assembly as the bearings rise and fall along the indentations and ridges of the thrust races. The vibrational frequency will depend on the frequency of rotation, the number of bearings and the number of indentations and ridges of the thrust races. At a drilling rate of 1000 rpm, a vibrational frequency of 12,000 vpm is easily achieved.

Dislodgement of the blockage will allow the core barrel assembly to return to its lower freely suspended position which in turn disengages the bearings from the upper thrust race.

Accordingly, the vibrational jarring force of the anti-blockage bearing of this invention is automatically engaged in the event of a blockage and the vibrational force will be maintained until the blockage is dislodged. As a result, the frictional deterioration of the invention is minimized. Furthermore, frictional resistance may be further reduced by designing the thrust races with gentle rising slopes relative to steeper falling slopes.

It is understood that modifications of the invention may be made by these skilled in the art without departing from the scope and spirit thereof. The embodiments disclosed or shown in the accompanying diagrams are to be interpreted as illustrative and not limiting of the scope of the invention as set out in the following claims:

I claim:

1. An apparatus for rotary core drilling comprising:
an outer tube having a longitudinal axis;
a core barrel assembly freely suspended within said outer tube for axial motion with respect to said outer tube, said core barrel assembly having a lower end for receiving a core sample and an upper end;
a core barrel coupling assembly supporting said outer tube and connecting said outer tube to a rotatable drill rod;
an anti-blockage bearing assembly situated between said upper end of said core barrel assembly and said core barrel coupling, said anti-blockage bearing assembly comprising a plurality of spherical ball bearings retained within coaxial upper and lower annular retaining members, said upper annular retaining member being mounted to said core barrel coupling for rotation therewith and said lower annular retaining member being mounted on said upper end of said core barrel assembly;
at least one of said annular retaining members being provided with an annular thrust race having an undulating surface incorporating a plurality of ridges and intervening indentations;
means maintaining said plurality of spherical ball bearings disengaged from said upper annular retaining member during non-blockage operation of said rotation core drilling apparatus;
said core barrel assembly and said lower annular retaining member automatically axially elevating upwardly toward said core barrel coupling in direct response to a blockage at said lower end of said core barrel assembly to engage said spherical ball bearings with both said upper and lower annular retaining members; and
means for causing relative rotational movement between said upper and lower annular retaining members when said core barrel assembly is blocked wherein said at least one annular thrust race creates vibrational forces on said upper end of said core barrel assembly due to the upward axial displacement of said core barrel assembly and said lower annular retaining member, said vibrational forces acting longitudinally downwardly along said core barrel assembly to automatically eliminate said blockage at said lower end of said core barrel assembly.

2. The apparatus of claim 1 wherein said ridges are provided with gently rising slopes and steeply falling slopes.

3. The apparatus of claim 1 wherein both of said upper and lower annular retaining members are provided with an annular thrust race having an undulating surface incorporating a plurality of ridges and intervening indentations.

* * * * *